(12) United States Patent
Amada

(10) Patent No.: US 8,522,263 B2
(45) Date of Patent: Aug. 27, 2013

(54) AUDIO SIGNAL PROCESSOR, TELEVISION SET AND COMPUTER READABLE MEDIUM

(75) Inventor: Tadashi Amada, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 109 days.

(21) Appl. No.: 13/172,643

(22) Filed: Jun. 29, 2011

(65) Prior Publication Data

US 2012/0124603 A1    May 17, 2012

(30) Foreign Application Priority Data

Nov. 12, 2010  (JP) .................................. 2010-253947

(51) Int. Cl.
  *H04N 7/16*    (2011.01)
(52) U.S. Cl.
  USPC ................................ 725/10; 725/11; 709/219
(58) Field of Classification Search
  USPC ............................... 725/10–19; 709/217–232
  See application file for complete search history.

(56) References Cited

U.S. PATENT DOCUMENTS

| 7,921,074 B2* | 4/2011 | Nagamine et al. | 707/607 |
| 8,248,448 B2* | 8/2012 | Feng et al. | 348/14.01 |
| 2006/0206560 A1* | 9/2006 | Kanada | 709/201 |
| 2012/0092445 A1* | 4/2012 | McDowell et al. | 348/14.16 |

FOREIGN PATENT DOCUMENTS

| JP | 2004-109361 | 4/2004 |
| JP | 2005-274707 | 10/2005 |
| JP | 3795610 | 4/2006 |
| JP | 2007-010897 | 1/2007 |

OTHER PUBLICATIONS

Nobuyoshi Kikuma, Adaptive Signal Processing with Array Antenna, (Science and Technology Publishing Company, Inc., 2004).

* cited by examiner

*Primary Examiner* — Annan Shang
(74) *Attorney, Agent, or Firm* — Blakely, Sokoloff, Taylor & Zafman LLP

(57) ABSTRACT

In one embodiment, there is provided an audio signal processor. The processor includes: a person position detector configured to detect each position of one or more persons present in a specific space; a grouping module configured to allocate the detected persons to one or more groups, wherein the number of the groups is less than a given number; a plurality of directionality controllers configured to control directionality of a microphone array; and a directionality setting module configured to set directionality of each of the groups in a corresponding one of the directionality controllers.

10 Claims, 17 Drawing Sheets

AUDIO SIGNAL PROCESSOR, TELEVISION SET AND COMPUTER READABLE MEDIUM

CROSS-REFERENCE TO RELATED APPLICATION

This application claims priority from Japanese Patent Application No. 2010-253947, filed on Nov. 12, 2010, the entire contents of which are hereby incorporated by reference.

BACKGROUND OF THE INVENTION

1. Field

Embodiments described herein relate to an audio signal processor, a television set and a computer readable medium.

2. Description of the Related Art

Techniques are known for using a microphone array to emphasize only sound emitted from a target direction. A technique is also proposed for detecting the position of a person by using a camera, and facing the directionality of the microphone array towards the detected person. The apparatus of this proposal detects the position of a speaker, extracts a direction and a range for extracting speech for each of the speakers based on the positional relationships of the detected speakers, and extracts a voice within the ranges with voice extraction means.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

According to exemplary embodiments of the present invention, there is provided an audio signal processor. The processor includes: a person position detector configured to detect each position of one or more persons present in a specific space; a grouping module configured to allocate the detected persons to one or more groups, wherein the number of the groups is less than a given number; a plurality of directionality controllers configured to control directionality of a microphone array; and a directionality setting module configured to set directionality of each of the groups in a corresponding one of the directionality controllers.

Exemplary embodiments will be now described with reference to the drawings.

First Exemplary Embodiment

Figure 1:
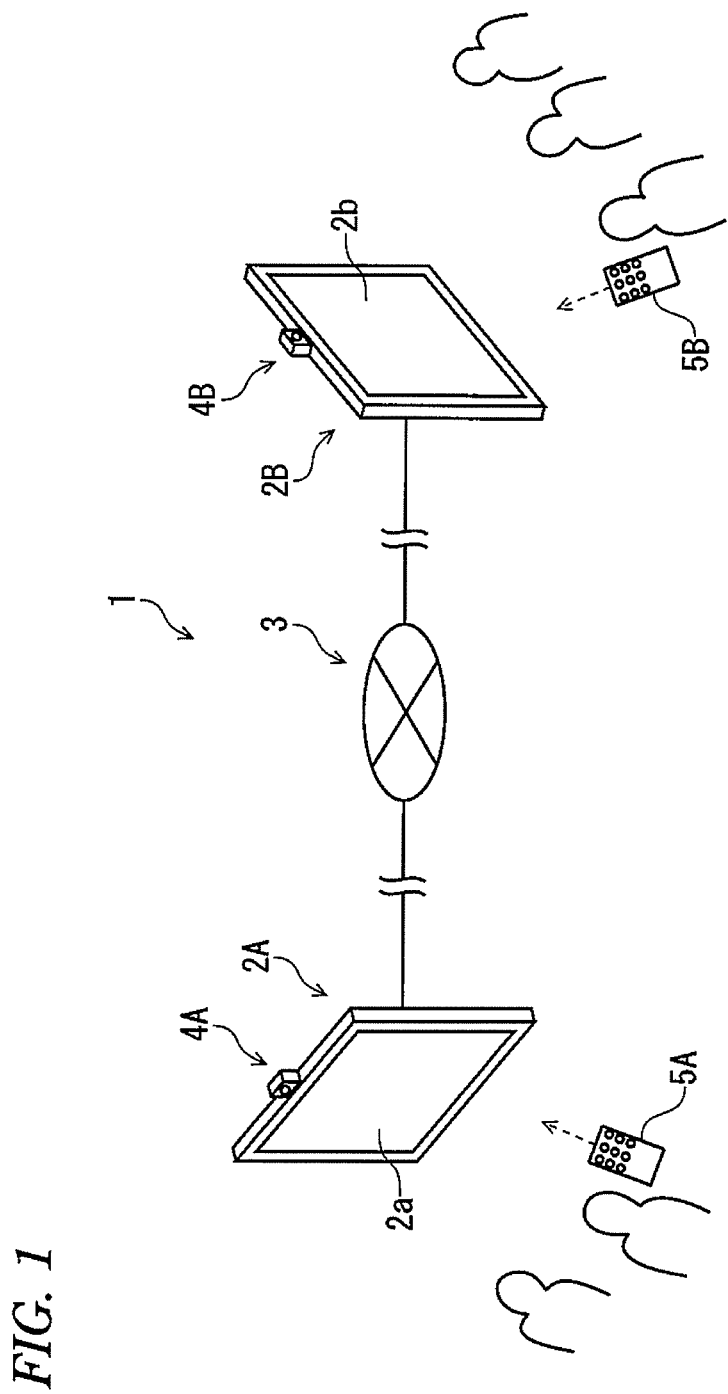
FIG. 1 is an explanatory diagram of an example of a videoconferencing system using an audio signal processor according to a first exemplary embodiment.

FIG. 1 is an explanatory diagram of an example of a videoconferencing system applied with an audio signal processor according to a first exemplary embodiment.

As shown in FIG. 1, a videoconferencing system 1 is a system employing a television broadcasts receiving television set (referred to below as a television) to enable spatially distanced persons to talk to each other while viewing images of the counterparty displayed on a television screen. The videoconferencing system 1 includes two televisions 2A, 2B disposed at mutually separated locations, with the televisions 2A, 2B connected together and capable of communication via Internet 3, serving as a communication line.

Each of the televisions 2A, 2B (sometimes one or both of the televisions is/are referred to below as television(s) 2) is both capable of television broadcast reception, and is capable, by Internet connection, of transmitting and receiving video signals and audio signals between each other via the Internet 3. To accomplish this, units 4A, 4B with respective internal cameras and microphone arrays are attached to the televisions 2A, 2B (sometimes one or both units are referred to below as unit(s) 4).

When the televisions 2 are in broadcast reception mode, television broadcast content is displayed on the television screens 2a of the televisions 2, and when the televisions 2 are in a videoconference mode, described later, images of the counterparty are displayed on the television screens 2a.

Figure 2:
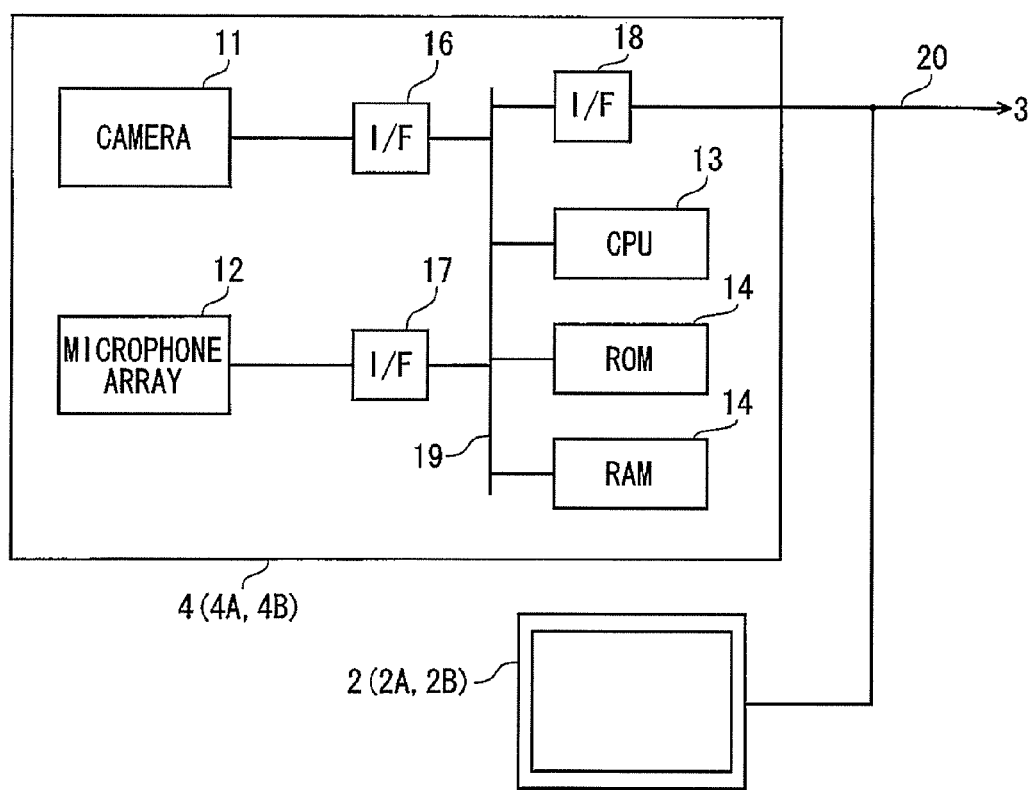
FIG. 2 is a block diagram showing a configuration of each television 2 and each unit 4, according to the first exemplary embodiment.

Each of the units 4, serving as videoconference units, includes a camera for capturing an image in front of the screen of the corresponding television 2, and a microphone array for picking up voices in front of the television 2 (see FIG. 2). By operating remote controllers 5A, 5B (sometimes one or both remote controllers are referred to below as remote controller(s) 5), users can display television broadcasts on the television screen or operate the videoconferencing function of the unit 4. The unit 4 configures an audio signal processor.

FIG. 2 is a block diagram showing a configuration of one of the televisions 2 and one of the units 4.

The unit 4 includes a camera 11, a microphone array 12, a Central Processor Unit (CPU) 13, ROM 14, RAM 15, and interfaces (abbreviated to I/F below) 16, 17, 18. The CPU 13, ROM 14 and the RAM 15 are connected together through a bus 19. The television 2 and the unit 4 are connected to a communication line 20 for connecting to the Internet 3.

The camera 11 includes an image capture element, such as a CCD, and outputs a digital picture signal. The microphone array 12 includes plural (in this example n-individual) microphones, and outputs an audio signal for each of the microphones. The camera 11 in the unit 4 mounted to the television 2 is disposed so as to capture images of the side where users are watching the television screen of the television 2, and the microphone array 12 is similarly disposed so as to pick up the voices of the users watching the television screen.

The I/F 16 is an interface for connecting the camera 11 and the bus 19. The I/F 17 is an interface for connecting the microphone array 12 and the bus 19. The I/F 18 is an interface for connecting the bus 19 and the communication line 20, which is in turn connected to the Internet 3. The television 2 is also connected to the communication line 20, providing a configuration enabling mutual communication between the television 2 and the unit 4. The television 2 combined with the unit 4 configures a videoconferencing enabled television set.

The CPU 13 is a processing section for executing various software programs (referred to below simply as programs), described later, stored on the ROM 14. The ROM 14 is a non-volatile storage section for storing the various programs, described later. The RAM 15 is a storage section employed as working area when the CPU 13 executes the various programs.

The various programs, for execution when the unit 4 is functioning as an audio signal processor during operation of the videoconferencing system 1, are installed on the ROM 14.

Note that while the videoconferencing system 1 shown in FIG. 1 and FIG. 2 has the television 2 and the unit 4 as separate bodies, with the unit 4 mounted to the television 2, configuration may be made with the unit 4 internally installed in the main body of the television 2.

Figure 3:
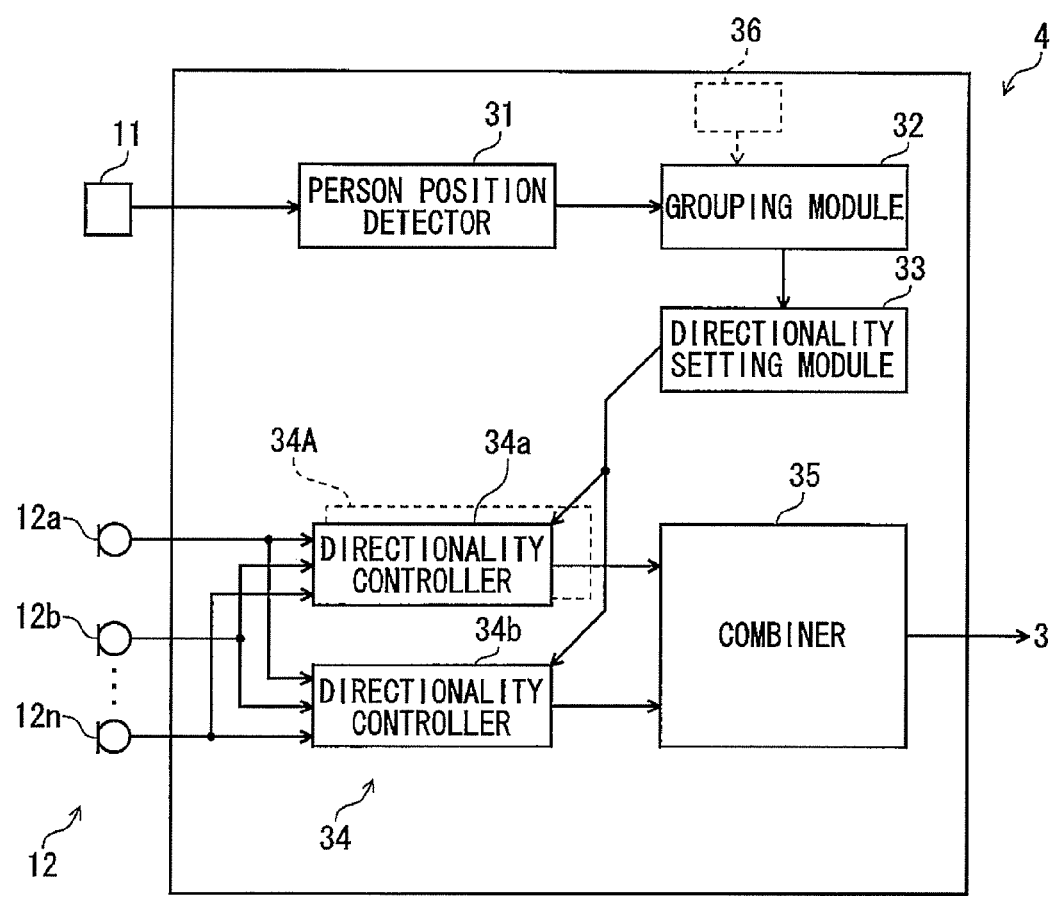
FIG. 3 is a block diagram showing a software configuration of the unit 4, according to the first exemplary embodiment.

FIG. 3 is a block diagram showing a software configuration of the unit 4. Each of the blocks in the unit 4 is configured by a program. The unit 4 is configured including a person position detector 31, a grouping module 32, a directionality setting module 33, plural (in this example 2) directionality controllers 34a, 34b, and a combiner 35.

A digital video signal from the camera 11 is input to the person position detector 31.

The person position detector 31 identifies imaged people based on the input video signal, detects the position of each person, and outputs this positional data to the grouping module 32. The camera 11 capture images of a specific space in front of the television 2, and hence the person position detector 31 configures a processing section for detecting the position of people present in the specific space. The person position detector 31 detects the respective positions of plural people by face recognition processing that recognizes faces of people in images. The position of each person imaged by the camera 11 in the specific space is calculated from the positional relationship between the position of each of the imaged faces and a specific reference position. Namely, when plural faces are detected, the person position detector 31 computes the position of each person corresponding to the position of each face.

The grouping module 32 groups the detected people into groups based on the input positional data, and when plural people are detected performs grouping into a specific number of groups. The identified single person or two or more people are divided into a number of groups, up to a predetermined upper limit number of groups. The grouping module 32 hence configures a processing section that performs grouping by allocating the single person, or two or more people, detected by the person position detector 31 into a number of groups of the specific number of less.

For example, when the upper limit for the specific number is 2 and a single person has been detected, then the number of groups island when two people have been detected the number of groups is two. Furthermore, when the upper limit is 2, even if the number of people identified is three or more, the number of groups of the grouping is still only 2.

The upper limit of the number of groups is determined according to the processing power of the CPU 13. The processing time for programs depends on the processing power of the CPU 13. The higher the processing power of the CPU 13 the shorter the processing time of a single directionality controller from the directionality controllers 34 in the CPU 13, and the lower the processing power of the CPU 13, the longer the processing time for a single directionality controller.

More specifically, the upper limit to the number of groups is determined such that in the directionality controllers 34 the computational load for configuring a directional beam in the designated direction in the microphone array 12 and for audio processing does not become as great as a computational load unable to maintain operation of the videoconferencing system 1 in the required real-time.

For example, if the processing power of the CPU 13 for audio processing is 100 Million Instructions Per Second (MIPS), and the processing time for a single directionality controller is 50 MIPS, then processing for two directionality controllers is the limit for the processing power of the CPU 13. In such a case, the upper limit of the number of groups is 2, and the unit 4 can have two directionality controllers. There now follows a description regarding a method for grouping the detected people.

The grouping module 32 computes and determines directionality data on a group by group basis (namely beam data) based on the positional data of the people grouped into groups, and outputs the beam data to the directionality setting module 33. The beam data includes data of a set direction ds for the directionality and data of a set range θs. The set direction ds is the central direction of the set range θs. For example, the set range θs is the angular width with the set direction ds at the center.

The grouping module 32 performs grouping based on detected person positional data according to a specific rule, however, configuration may also be made in order to maximize noise suppression performance, namely performance, i.e. optimized grouping may be performed. Explanation regarding a method for optimized grouping is given later.

The grouping module 32 supplies beam data for each of the grouped groups to the directionality setting module 33.

Based on the beam data for each of the groups, the directionality setting module 33 generates setting data for configuring each beam on a group by group basis, such that the voice of speaker(s) in each of the groups is emphasized. The setting data is supplied to the corresponding directionality controller 34a, 34b. For example, when the people detected is actually a single person, setting data is only supplied and set in the directionality controller 34a, and only the directionality controller 34a configures a beam based on this setting data. However, if the people detected are two or more people, then respective setting data is supplied and set in the directionality controllers 34a, 34b, and the directionality controllers 34a, 34b both configure beams based on the respective setting data.

Namely, the grouping module 32 performs grouping of the people, and the directionality setting module 33 controls each of the directionality controllers 34 such that directionality is configured on a group basis. The directionality setting module 33 hence configures a processing section for setting in the corresponding directionality controller 34 the directionality for each group that has been grouped by the grouping module 32.

The plural directionality controllers 34a, 34b configure processing sections for controlling the directionality of the microphone array based on the set respective directionalities. Namely, each of the directionality controllers 34 emphasizes voices arriving from a set direction. The digital audio signals that have been subjected to voice emphasis processing by the directionality controllers 34a, 34b are added together to give a combined signal by the combiner 35 and transmitted to the Internet 3. The directionality controllers 34 perform array processing on the respective input n-individual audio signals to realize the respective set directionalities. Examples of array processing are, for example, described in Japanese Patent No. 3795610 and JP-A-2007-10897.

Note that configuration may be made such that the plural digital audio signals obtained by voice emphasis processing in the directionality controllers 34a, 34b are not combined in the combiner 35, and are instead transmitted separately over the Internet 3.

As described above, settings are determined for configuring the directionality appropriate for emphasizing the voices of people in each of the groups generated by grouping. The directionality controller 34 performs specific filtering computation on the respective audio signals from the plural microphones 12a to 12n based on these settings. The directionality of the microphone array 12, namely a beam, is configured by performing processing to add together these computation results. The two, this being the upper limit number here, directionality controllers 34a, 34b configure beams so as to operate as filter sets with mutually different characteristics.

In the present exemplary embodiment, and also in other following exemplary embodiments, explanation is given of cases in which the position of a speaker is determined by an angle in the horizontal direction, however there is no limitation thereto. Configuration may be made such that plural speakers are grouped in the depth direction, such as by disposing plural microphones in a two dimensional array, so as to control in the depth direction of the space in which the speakers are situated.

Method of Grouping

Figure 4:
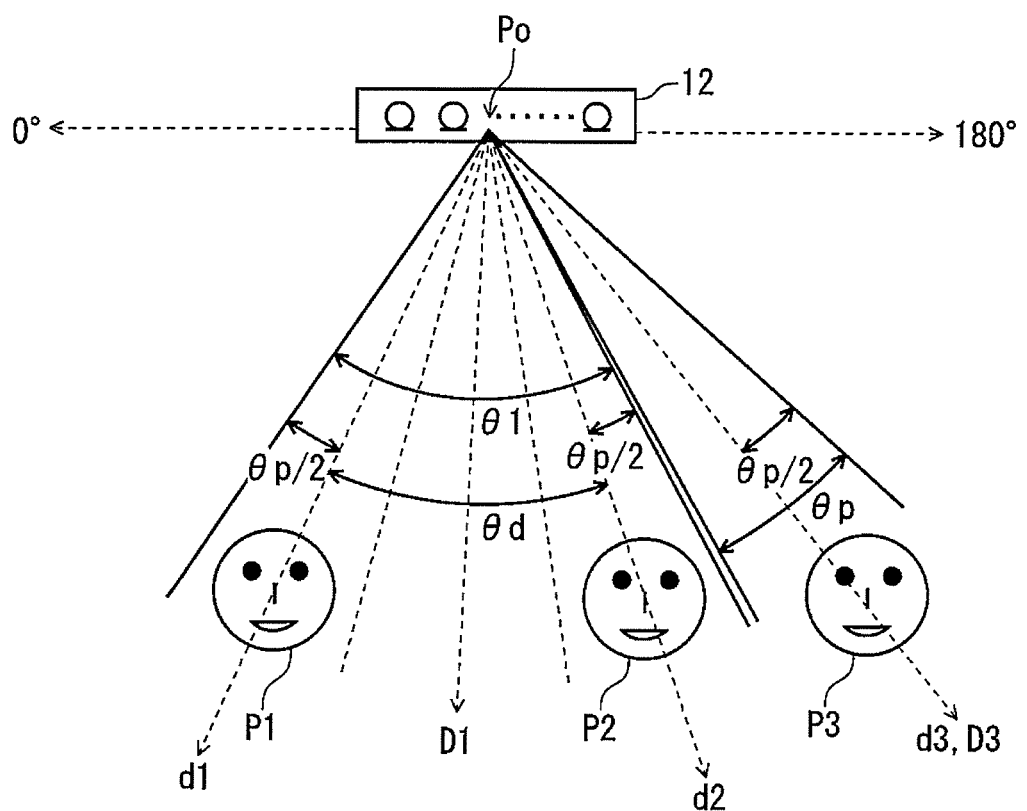
FIG. 4 is an explanatory diagram showing a mode in which grouping is made into 2 groups with respect to a specific position on a microphone array 12 or on a television screen 2a when 3 people are detected by a person position detector 31.

Explanation follows of a method by which the grouping module 32 performs grouping. FIG. 4 is an explanatory diagram showing, when three people have been detected by the person position detector 31, a mode of grouping into 2 groups with respect to a specific reference position on the microphone array 12 or the television screen 2a.

FIG. 4 shows an example in which three people, people P1, P2, P3, have been detected as being situated in directions d1, d2, d3, respectively, from the specific central position P0 of the microphone array 12, and a first group is configured with people P1, P2, and a second group is configured with person P3.

For example, the direction of the detected center of the face of each person may be determined as the direction of that person. In the example of FIG. 4, the person P1 is situated in direction d1. Similarly the people P2, P3 are situated in the directions d2 and d3, respectively.

Rule

Grouping of the detected people is performed according to a specific rule, and various rules are applicable as the specific rule. First, up until the number of people detected exceeds the upper limit to the number of groups, grouping is performed with a group for each of the detected people. However, when the number of people exceeds the upper limit, grouping is performed according to a specific rule. A simple rule out of such specific rules is, for example, a rule of grouping the detected people around from a specific reference direction (0°) of the microphone array 12 towards a specific direction (180°) such that there is a specific number of people in each group.

In the example of FIG. 4, the three detected people, people P1, P2, P3, are grouped around from the 0° direction towards the 180° direction such that there is a group of two people and a group of a single person. The people P1, P2 are in the first group, and the person P3 is in the second group. The direction D1, exactly in the middle between directions d1 and d2, is set as the set direction ds as the target sound source direction for the first group. The direction D2 of the direction d3 is set as the set direction ds as the target sound source direction for the second group. Furthermore, the range θ1, of ±(θ1)/2 about the target sound source direction D1, is set as the set range θs for the first group. The range θp, of ±θp/2 about the target sound source direction D2, is set as the set range θs for the second group.

For the group people, when there is only a single person in a single group, as in the second group here of FIG. 4, the set range θs has the specific range θp. However, when there are two or more people for the people in a single group, as in the first group here of FIG. 4, the set range θs is given the angle θ1 so as to include the angle θd between the people P1, P2, extended at each side by the respective specific ±θp/2.

Other configurations may be made, such as the grouping module 32 performing grouping based on a rule to even out the number of people allocated to each of the groups.

The grouping, as described above, is performed according to a specific rule. This specific rule is a rule that each detected person is grouped in their own group until the upper limit to the number of groups is exceeded, and when the number of people detected has exceeded the upper limit to the number of groups, group is made according to the specific rule such that the upper limit to the number of groups is not exceeded.

Optimum Grouping

Figure 5:
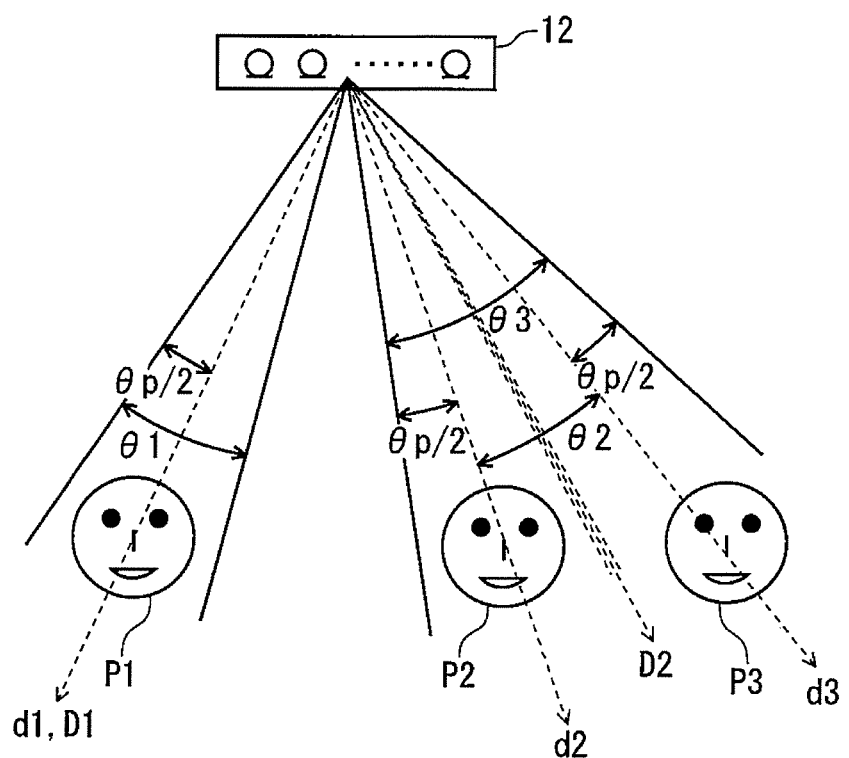
FIG. 5 is an explanatory diagram showing a method for performing grouping so as to maximize the sum of noise suppression performance of the microphone array 12.

The grouping module 32 may be configured to perform optimized grouping so as to maximize the sum of the noise suppression performance of the microphone array 12. FIG. 5 is an explanatory diagram of a method for forming grouping so as to maximize the sum of the noise suppression performance of the microphone array 12. The distribution of people is the same as FIG. 4, however, the three people, the people P1, P2, P3, are grouped in different groups to in FIG. 4.

In the case shown in FIG. 5, the person P1 is in the first group, and the people P2, P3 are in the second group. The first group (the group of person P1) has the same set range θs as that of the second group (the group of person P3) of FIG. 4.

The second group (the group of people P2, P3) has a narrower set range θs than that of the first group (the group of people P1, P2) of FIG. 4.

In FIG. 5, the set range θs of the second group is the angle θ3, narrower than the θ1 of the set range θs of the first group in FIG. 4.

The narrower the set range θs, the higher the performance in emphasizing only sound from the target direction. In the example of FIG. 4, there is barely a gap between the people P2, P3, and supposing noise was to arrive from between this gap, then it couldn't be suppressed. In contrast thereto, there is a gap between the people P1, P2 in the example of FIG. 5, and even if noise arrives from the direction of this gap then it can be suppressed.

Hence, the grouping shown in FIG. 5 can be called a better grouping than the grouping of FIG. 4. This is because when there are two grouping arrangements having different set range θs from each other, since the method of grouping giving the largest sum of (1/θs) as an evaluation value EV gives higher emphasizing performance of the system as a whole than other methods of grouping, the method of FIG. 5 can be called better grouping that that of FIG. 4.

Accordingly, as a method of optimizing grouping, when the number of people detected exceeds the upper limit to the number of groups, a rule can be employed to give optimized grouping by postulating grouping combinations obtained with all of the detected people, and grouping with the combination grouping having the largest total sum of EVs for the evaluation values EV (=1/θs) of each group from out of the postulated combinations obtained. Namely, the grouping module 32 can employ as the evaluation criteria a rule in which the total sum of EVs for the specific evaluation values is computed for all of the combinations within the range of the upper limit to the number of groups, and the grouping is selected to give the greatest value for this total sum of EVs.

For example, in FIG. 4, if the set range θs of the first group (=θ1) is 65° and the set range θs of the second group (=θp) is 20°, then the total sum of EVs1 for the above evaluation values is ((1/θs)+(1/θp)=((1/65)+(1/20)). In contrast thereto, in the example in FIG. 5, if the set range θs of the first group (=θp) is 20° and the set range θ3 of the second group is 38°, then the above evaluation value total sum EVs2 is ((1/θp)+(1/θ3))=((1/20)+(1/38)). Since EVs2>EVs1, the combination of FIG. 5 has a higher evaluation value EV than the combination of FIG. 4.

Hence, the grouping module 32 makes comparisons between such evaluation value total sums EVs for all possible grouping combinations, and determines optimized grouping as the grouping combination with the highest evaluation value total sum EVs.

Processing

Figure 6:
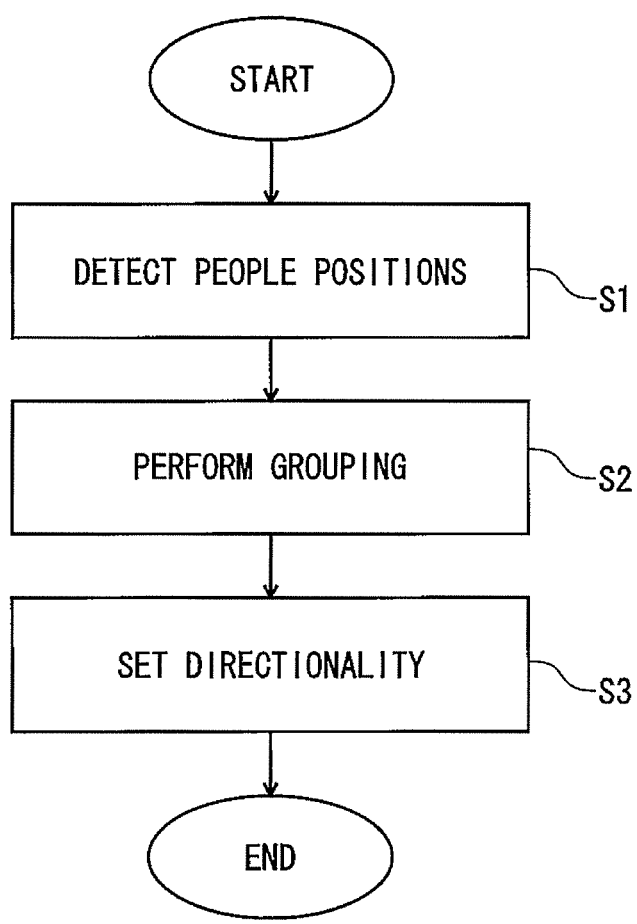
FIG. 6 is a flow chart showing an example of directionality setting processing flow in the unit 4 according to the first exemplary embodiment.

FIG. 6 is a flow chart showing an example of the flow of the directionality setting processing in the unit 4. The processing of FIG. 6 is executed by the CPU 13 when the videoconferencing function of the videoconferencing system 1 is switched ON. A user can switch ON the videoconferencing function by operating the remote controller 5.

First, the CPU 13 uses the person position detector 31 to detect the positions of people (S1), then uses the grouping module 32 to perform grouping as described above (S2). The CPU 13 uses the directionality setting module 33 to set the directionality for each of the directionality controllers 34 based on the grouping results (S3).

Each of the directionality controllers 34 controls the beam and performs audio processing based on the set directionality data. The audio signals processed by the directionality controllers 34 are combined by the combiner 35, and transmitted to the counterparty videoconferencing system via the communication line of the Internet 3.

After the processing of FIG. 6 has been executed, the processing of FIG. 6 is not re-executed as long as there is no change detected in the positions of people by the person position detector 31. However, if the position of the people changes then the processing for grouping and directionality setting of FIG. 6 is re-executed.

As a result, the spatially separated counterparties can utilize the televisions 2 to participate in videoconferencing in real time, without problems such as sound cutting out.

Note that in the examples described above, the number of groups is increased until the upper limit of number of groups is reached, however configuration may be made to enable the preset upper limit to be changed by a user.

Figure 7:
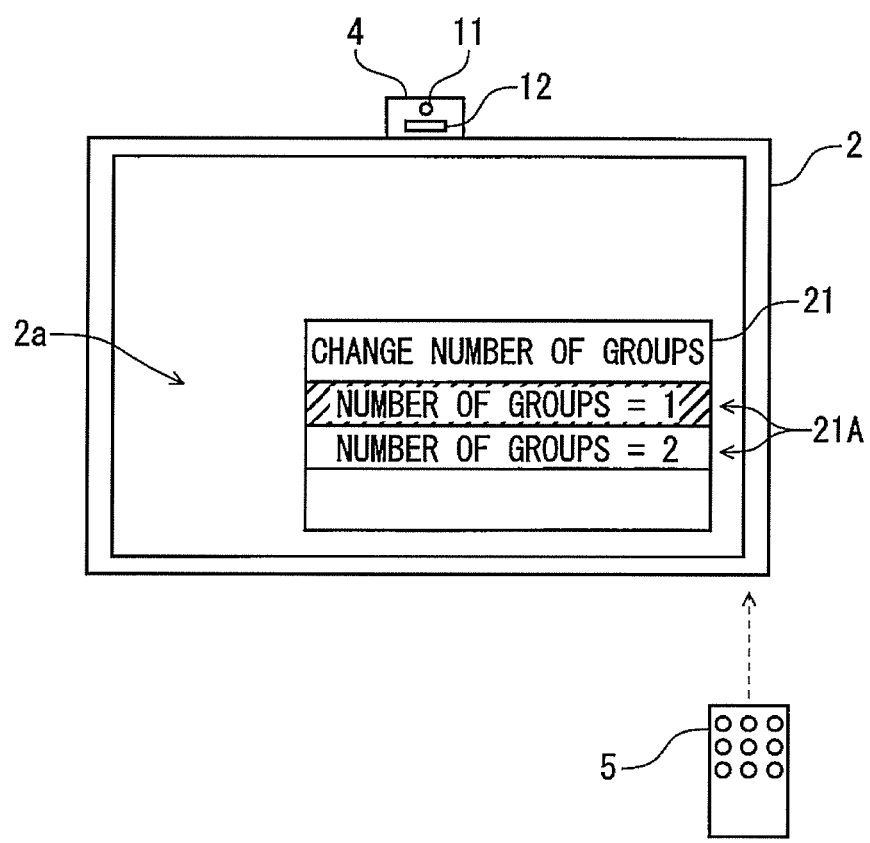
FIG. 7 is an explanatory diagram showing changing of the number of groups, namely the number of beams.

FIG. 7 is an explanatory diagram of changing the number of groups, namely changing the number of beams. When a user performs a specific operation on the remote controller 5 of the television 2 they themselves are watching, the upper limit of the number of beams can be displayed on a setting change screen 21, like that illustrated in FIG. 7. The setting change screen 21 is displayed as a sub-window on the screen 2a of the television 2. The program for displaying the setting change screen 21 is pre-stored in the ROM 14.

The setting change screen 21 includes a display section 21A for displaying possible numbers of beams that can be adopted. The user can operate the remote controller 5 to move a curser (shown by diagonal shading in FIG. 7) to the display section 21A having the desired number of beams. For example, in FIG. 7, the display section for "1" is selected, this being less than the upper limit number of "2". Confirmation of selection can be performed by the user operating the enter button on the remote controller 5.

Note that were the upper limit to have been "3" then the display sections 21A would be displayed as selectable for the number of the upper limit and for numbers less than the upper limit on the setting change screen 21, so as to render selectable "2" and "1", these being smaller than the upper limit.

For example, when a user selects "1" as the number of beams, this being less than the upper limit of "2", the computational load on the CPU 13 is decreased since the number of directionality controllers 34 required for beam forming is reduced (since a single directionality controller suffices). In such cases, since spare capacity can be achieved in the processing time of the CPU 13, this enables a different, more processing time intensive, directionality controller 34A (indicated by intermittent lines in FIG. 3) to be utilized, for example to execute directionality control to obtain a higher quality audio signal.

For example, in situations where there is only one person present, the user can user the setting change screen 21 to set the upper limit of the number of beams to "1", such that beam configuration is performed with the high performance directionality controller 34A. As a result, a higher quality audio signal can be transmitted to the counterparty.

The program stored on the ROM 14 for executing processing related to the screen shown in FIG. 7 configures a group number changing module 36 (indicated by intermittent lines in FIG. 3) for changing the number of beams, namely changing the number of groups.

Note that while the example given above is an example in which the group number changing module 36 can change the number of groups to a number smaller than the upper limit number, configuration may be made such that a preset upper limit is changed to a smaller number. Accordingly, the group number changing module 36 configures a processing section for changing the resulting number of groups from grouping or for changing a specific upper limit to the number of groups.

According to the present exemplary embodiment as described above, since grouping is performed within an upper limit of the number of groups in accordance with the processing power of the CPU, a videoconferencing system capable of ensuring real time audio signal processing can be provided.

Second Exemplary Embodiment

In the first exemplary embodiment, detection is made of the positions of people with detected faces, and then grouping is performed. However, a second exemplary embodiment differs from that of the first exemplary embodiment in respect that only the speaking person/people out of the detected people are grouped.

Explanation follows regarding the second exemplary embodiment, however explanation focuses mainly on the differing aspects, and configuration elements similar to those of the first exemplary embodiment are allocated the same reference numerals with further explanation thereof omitted.

Figure 8:
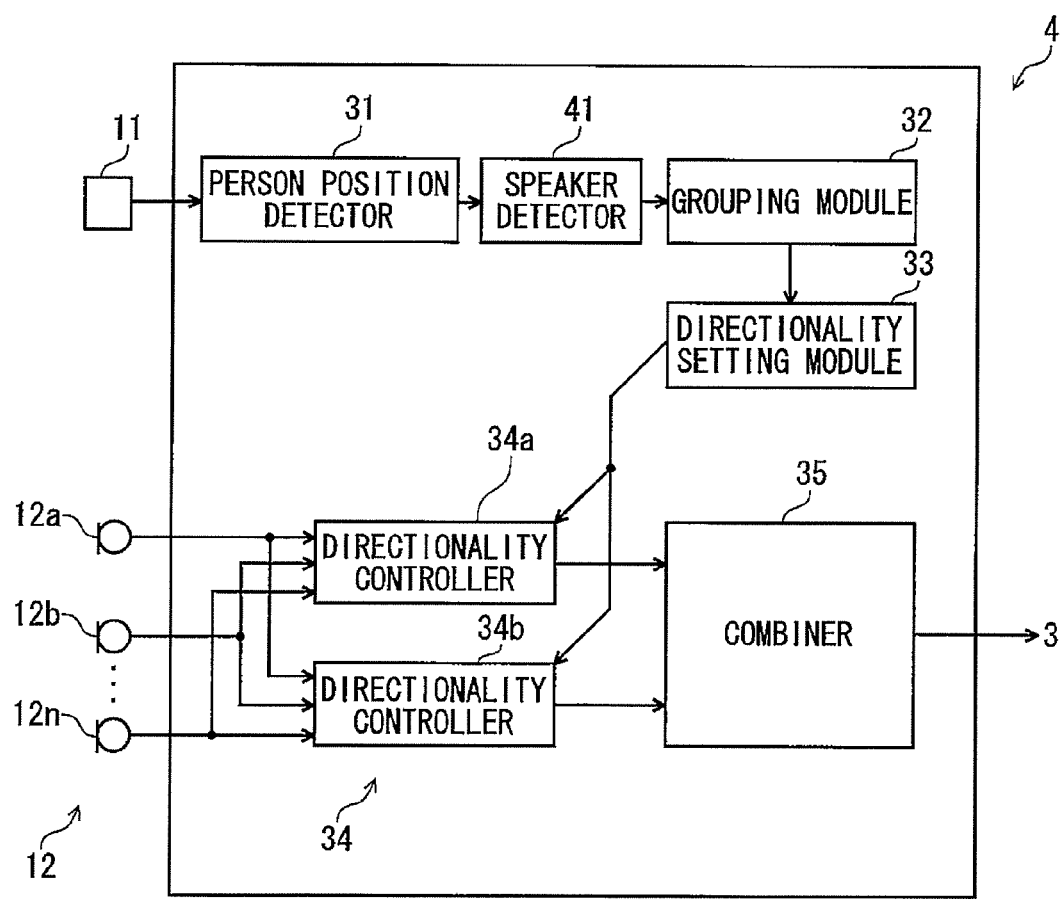
FIG. 8 is a block diagram showing a software configuration of a unit 4 according to a second exemplary embodiment.

FIG. 8 is a block diagram showing a software configuration of a unit 4 according to the second exemplary embodiment. FIG. 8 differs from FIG. 3 in that a speaker detector 41 is further included. The speaker detector 41 is a processing section for detecting which are speaker(s) out of all the people detected by the person position detector 31.

In the second exemplary embodiment, the speaker detector 41 detects whether or not a person has actual spoken, and only outputs the positional data for person/people detected as speaking to the following grouping module 32. The grouping module 32 thereby receives data of the correspondence relationship between the positions of people and the detected speakers.

Figure 9:
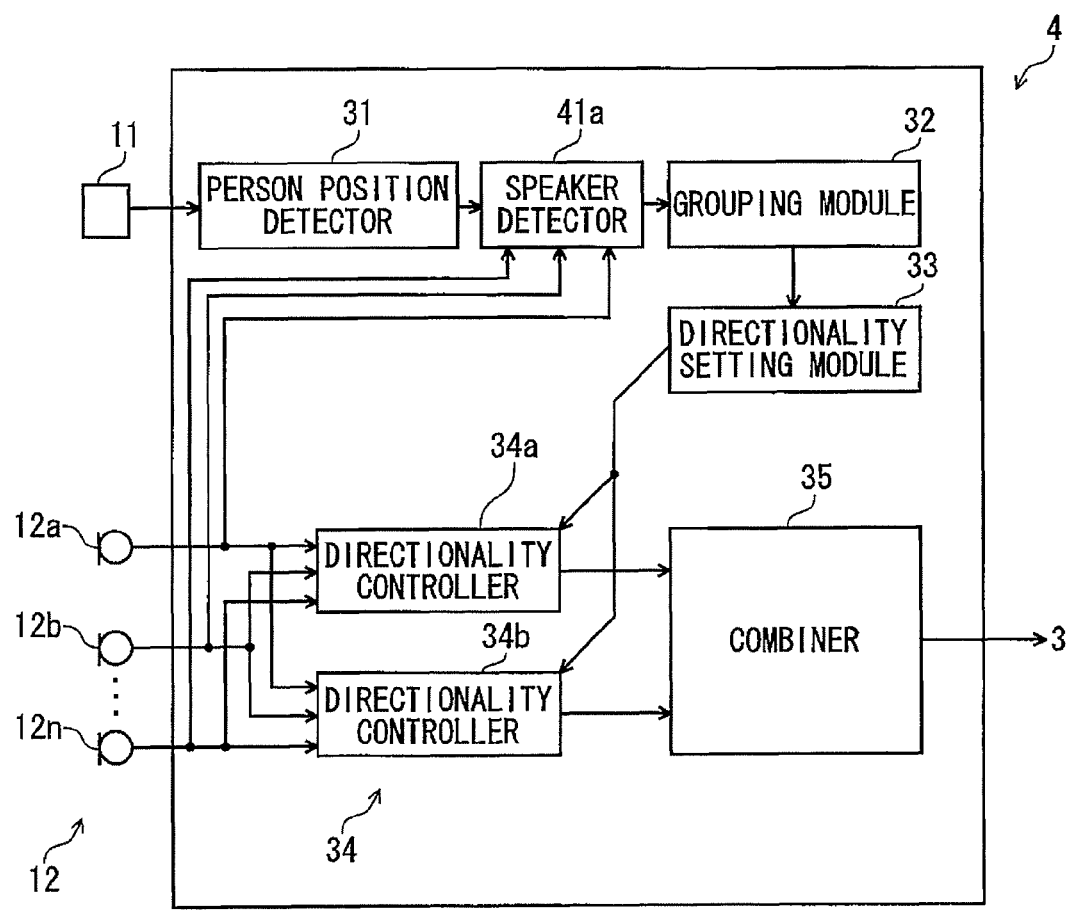
FIG. 9 is a block diagram showing a software configuration of a modified example of the unit 4 according to the second exemplary embodiment.

Configuration may be made such that the audio signals from the microphone array 12 are input to a speaker detector 41a, and determination is made that a person is speaker when the audio signal has been input at the same time as their mouth movements. FIG. 9 is a block diagram showing a software configuration according to a modified example of the unit 4 according to the second exemplary embodiment. In FIG. 9, in order to perform such determination according to mouth movements and audio signals, the audio signals from each of the microphones of the microphone array 12 are input to a speaker detector 41a.

Figure 10:
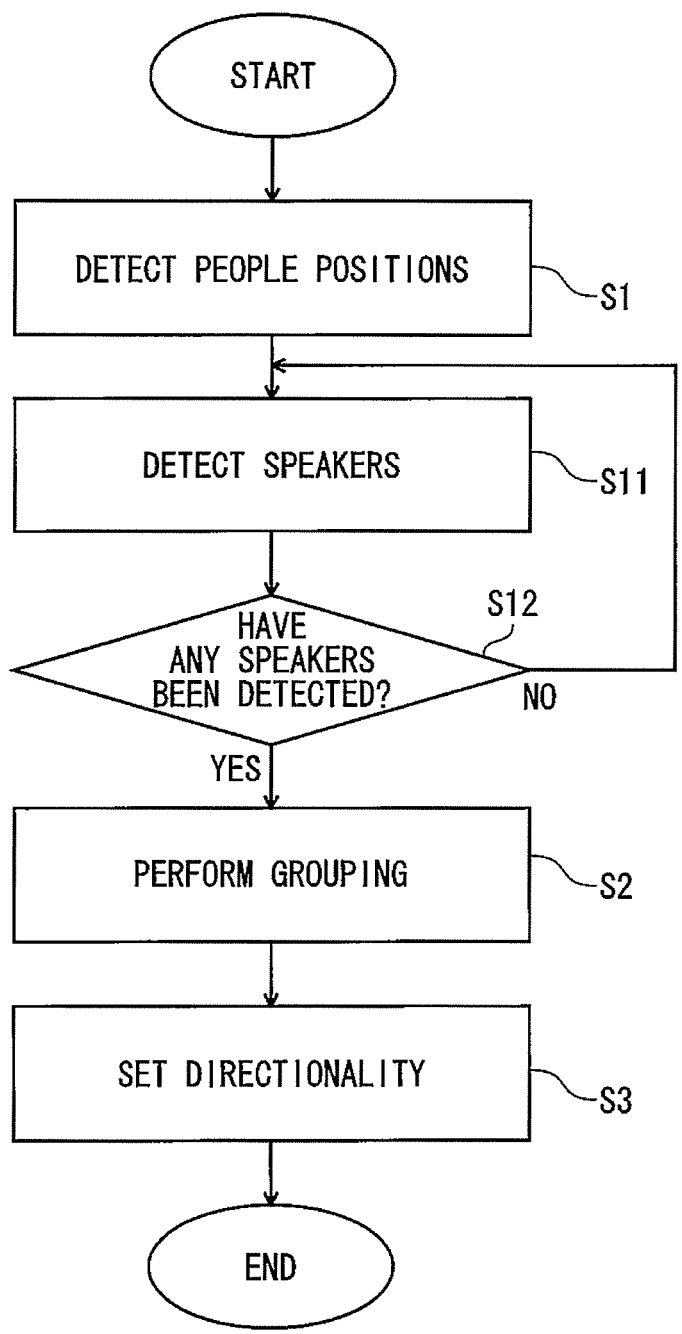
FIG. 10 is a flow chart showing an example of directionality setting processing flow in the unit 4 according to the second exemplary embodiment.

FIG. 10 is a flow chart showing an example of directionality setting processing flow in a unit 4 according to the second exemplary embodiment. In the processing of FIG. 10, subsequently to detecting the positions of people, speaker detection processing is performed by the speaker detector 41 (S11), whether or not speaker(s) have been detected is determined (S12), and grouping is performed when speaker(s) have been detected (S12: YES). The grouping module 32 performs grouping only on the speakers out of the one person, or two or more people, detected by the person position detector 31.

Wasteful directing of beams of the microphone array 12 towards people who, though present, are not speaking can accordingly be avoided, and also directionality towards objects incorrectly detected as being a person, but not actually a person, can be avoided. By performing re-grouping when speaker(s) are detected, the videoconferencing system 1 can be always operated in an optimum grouping state.

Through the addition of the speaker detector 41, since the detection sensitivity of the person position detector 31 can be set higher to more readily detect a person, so that detection is never missed even if this sometimes results in false positive incorrect detection occurring, problems of not setting directionality due to missed detection can be avoided.

Third Exemplary Embodiment

The second exemplary embodiment is configured such that only speakers are grouped out of the people whose faces had been detected, however a third exemplary embodiment differs from the second exemplary embodiment in that configuration is made such that any increase or decrease in the numbers of people present is monitored, and grouping is performed according to any such increase or decrease.

Explanation follows regarding the third exemplary embodiment, however explanation focuses mainly on the differing aspects, and configuration elements similar to those of the first or second exemplary embodiments are allocated the same reference numerals with further explanation thereof omitted.

Figure 11:
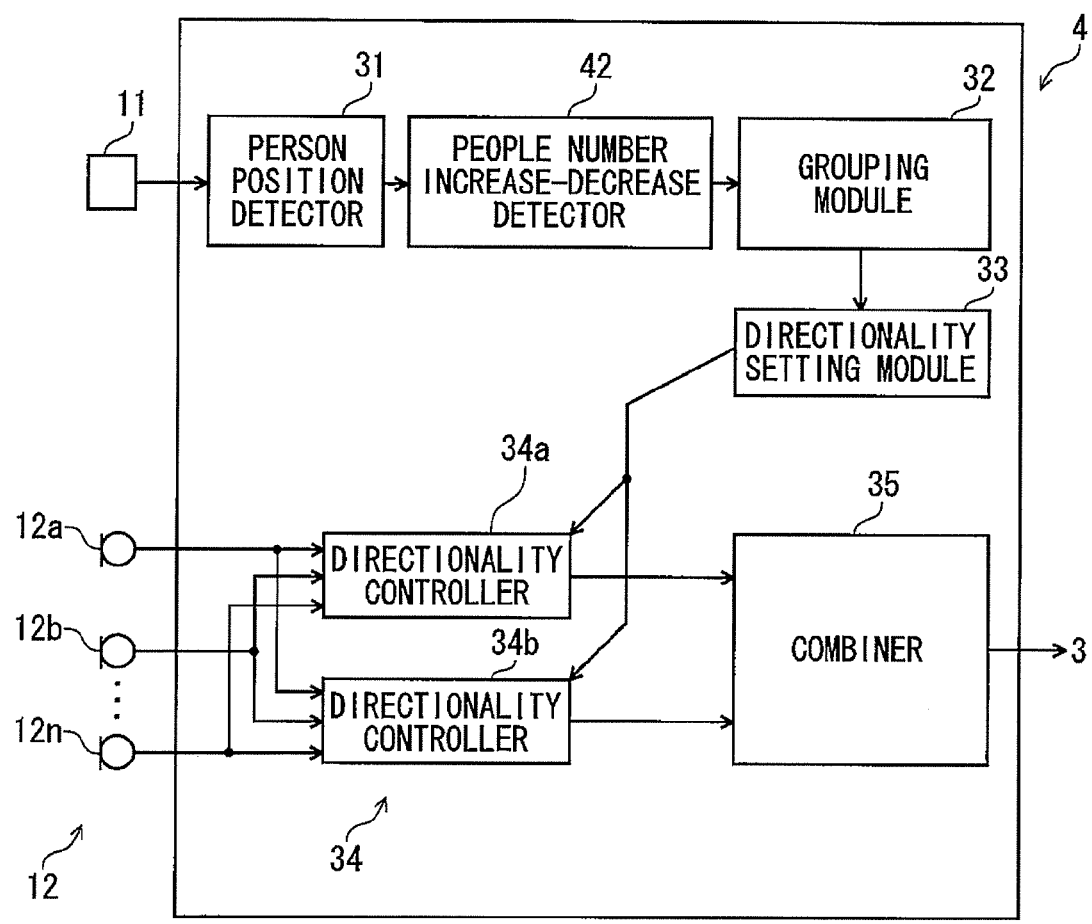
FIG. 11 is a block diagram showing a software configuration of a unit 4 according to a third exemplary embodiment.

FIG. 11 is a block diagram showing a software configuration of a unit 4 according to the third exemplary embodiment. FIG. 11 differs from FIG. 3 by including a people number increase-decrease detector 42. The people number increase-decrease detector 42 is a processing section for detecting any increase or decrease in the number of people detected by the person position detector 31.

Figure 12:
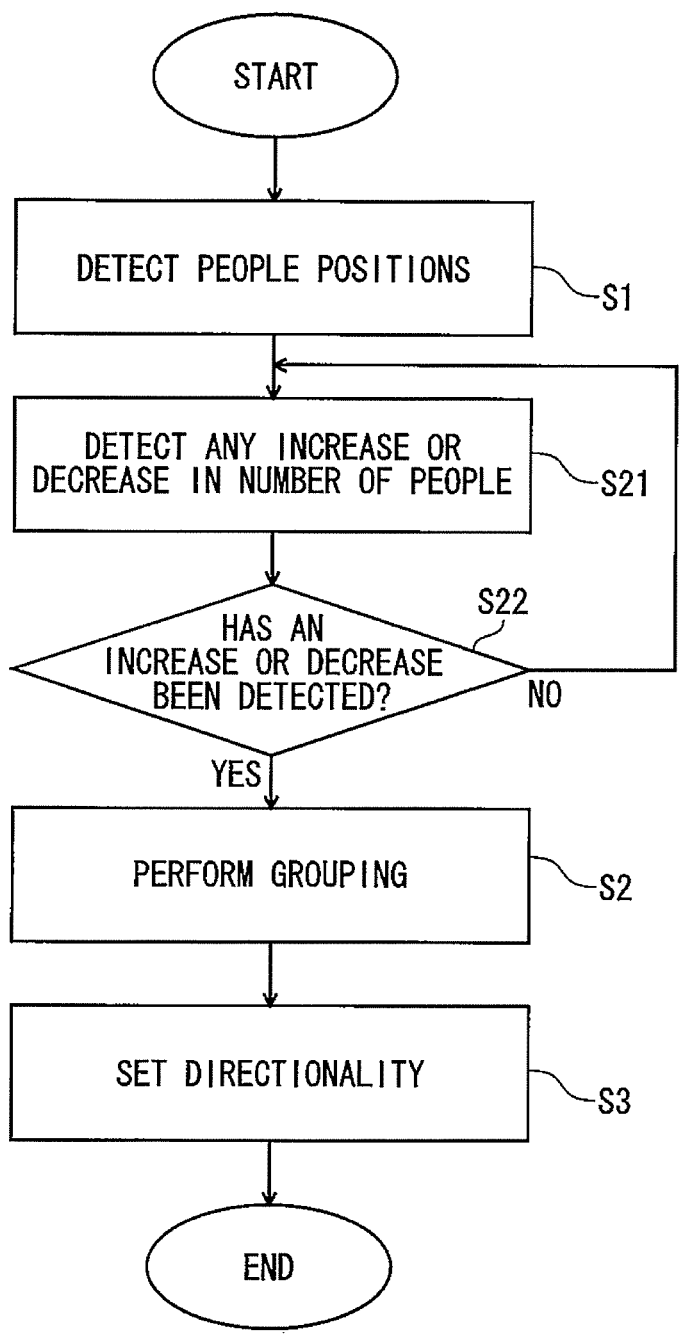
FIG. 12 is a flow chart showing an example of directionality setting processing flow in the unit 4 according to the third exemplary embodiment.

FIG. 12 is a flow chart showing an example of directionality setting processing flow in a unit 4 according to the third exemplary embodiment. In the processing shown in FIG. 12, subsequently to detecting the positions of people, the people number increase-decrease detector 42 performs people increase or decrease detection processing (S21), and determines as to whether or not the detected number of people has increased or decreased (S22). Grouping is performed when there has been an increase or decrease (S22: YES). The grouping module 32 performs grouping according to the increase or decrease detected in the number of people by the people number increase-decrease detector 42.

Appropriate directionality control is thereby possible even when a person/people present is a new person who has started participating in the videoconference partway through, or someone initially present leaves their seat and ceases to participate in the videoconference. Since grouping is re-performed when an increase or decrease in the number of people is detected, the videoconferencing system can be operated always in the optimally grouped state.

Fourth Exemplary Embodiment

Whereas the third exemplary embodiment groups according to the increase or decrease in the number of people, the fourth exemplary embodiment differs from the first, second and third exemplary embodiments in that, while there is no increase or decrease in the number of people present, when a person stops speaking partway through a session, the positional data of that person is first deleted, then re-grouping is performed.

Explanation follows regarding the fourth exemplary embodiment, however explanation focuses mainly on the differing aspects, and configuration elements similar to those of the first, second or third exemplary embodiments are allocated the same reference numerals with further explanation thereof omitted.

Figure 13:
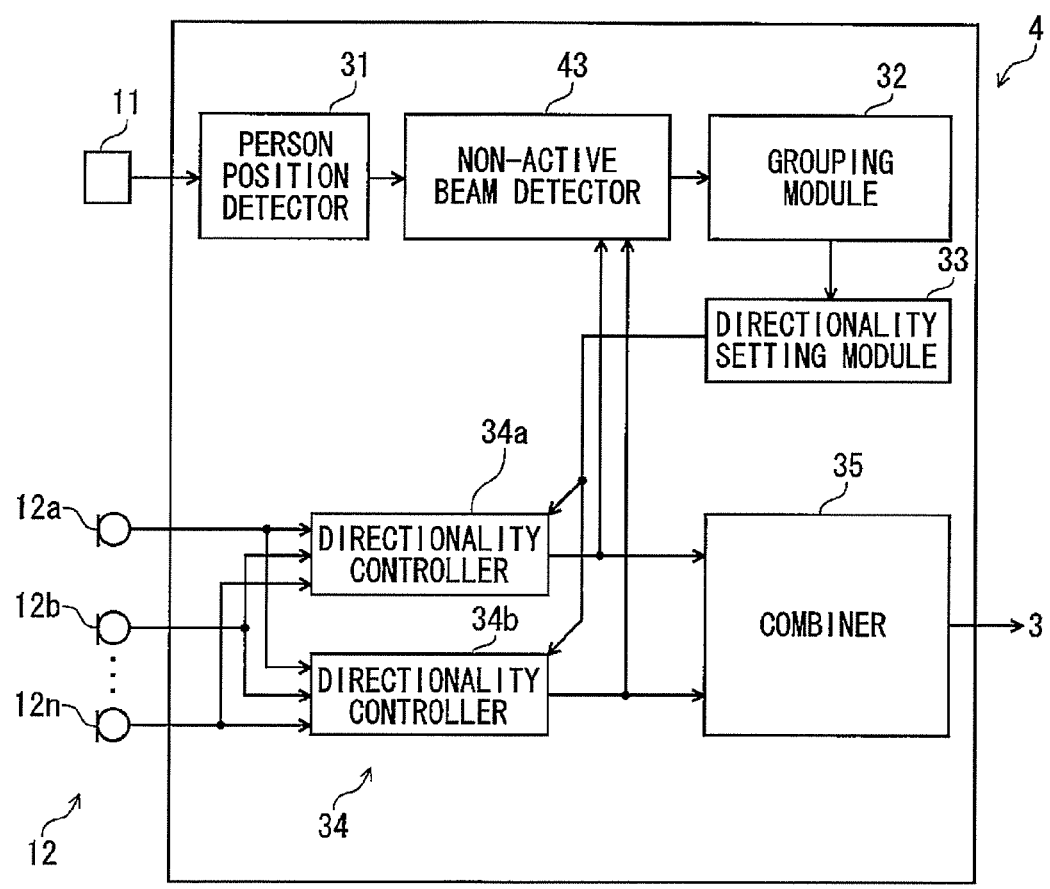
FIG. 13 is a block diagram showing a software configuration of a unit 4 according to a fourth exemplary embodiment.

FIG. 13 is a block diagram showing a software configuration of a unit 4 according to the fourth exemplary embodiment. Each of the blocks in the unit 4 is configured by a program. FIG. 13 differs from FIG. 3 by inclusion of a non-active beam detector 43. The non-active beam detector 43 performs detection for non-active beams based on output from each of the directionality controllers 34.

The non-active beam detector 43 detects whether or not speech has no longer been observed from a given beam direction for a specific duration of time or greater. The non-active beam detector 43 configures a speech state monitoring module that monitors the speech state by monitoring output of the directionality controllers 34 whose directionality has been set by the directionality setting module 33. When the non-active beam detector 43 detects that speech no longer being observed from a given beam, the non-active beam detector 43 outputs person positional data from which the positional data of people whose position corresponds to that beam has been deleted, to the grouping module 32. The grouping module 32 regroups based on this updated person positional data.

According to such a configuration, beams no longer required can be removed when speech is no longer observed for a specific duration of time when, for example, someone falls asleep partway through a session.

Note that in the configuration of FIG. 13, when there are plural people in a given group, re-grouping is only performed when speech from all of these people has ceased. However, configuration may be made such that re-grouping is performed even if only one person in the group stops speaking, by utilizing a modification of the configuration of the non-active beam detector 43.

Figure 14:
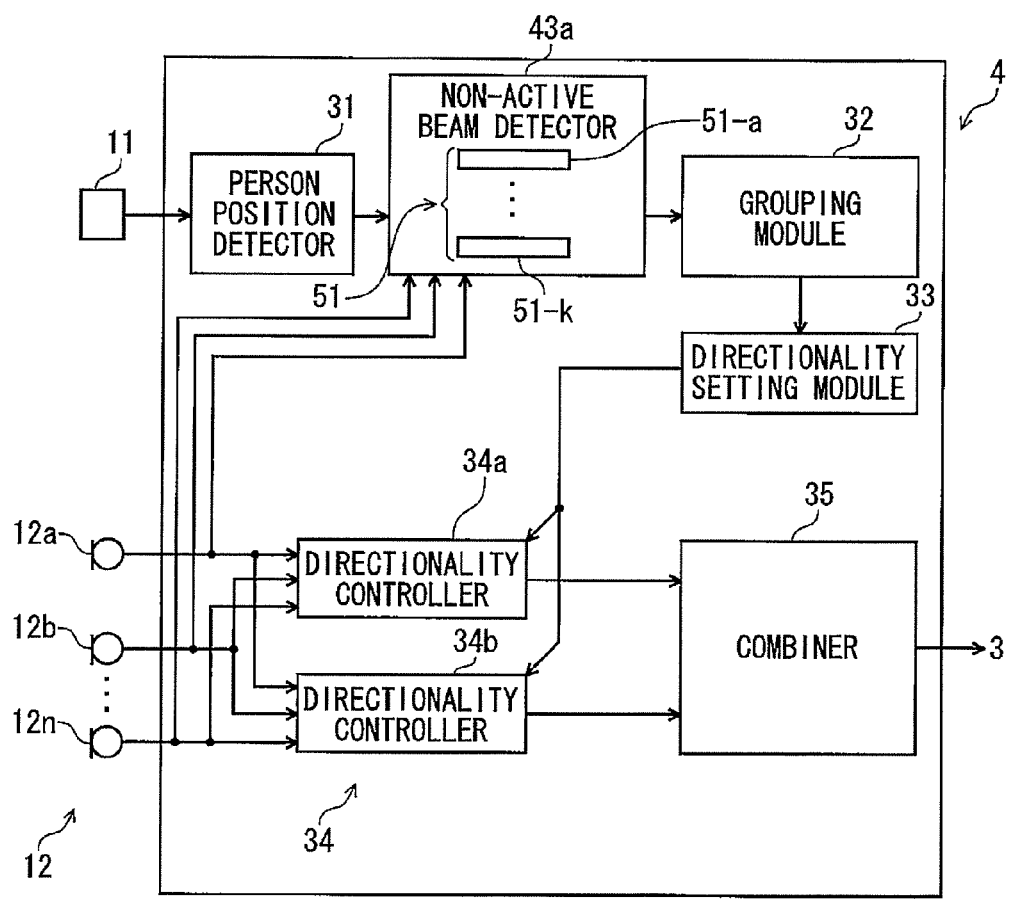
FIG. 14 is a block diagram showing a software configuration of a modified example of the unit 4 shown in FIG. 13.

FIG. 14 is a block diagram showing a software configuration according to a modified example of the unit 4 of FIG. 13. In FIG. 14 the audio signal from each of the microphones of the microphone array 12 is input to a non-active beam detector 43a. The non-active beam detector 43a is configured with directionality controllers 51-a to 51-k, wherein k is the number of people detected, (sometimes one or more of the directionality controller 51-a to 51-k are referred to below as directionality controller(s) 51).

One of the directionality controllers 51 is generated for each of the detected people. The directionality controllers 51 detect whether or not speech has no longer been observed for a specific duration from the people at the people positions received from the person position detector 31. Consequently, the non-active beam detector 43a configures a speech state monitoring module that monitors the speech of people detected by the person position detector 31.

Since the program for the directionality controllers 51 is not a program directed towards real time conversations in videoconferencing, the program may be one of higher performance that takes greater processing time.

When the non-active beam detector 43a detects that speech is no longer being detected from one of the people detected by the person position detector 31, person positional data from which the positional data of this person has been deleted is output to the grouping module 32. The grouping module 32 performs regrouping based in this updated person positional data.

Figure 15:
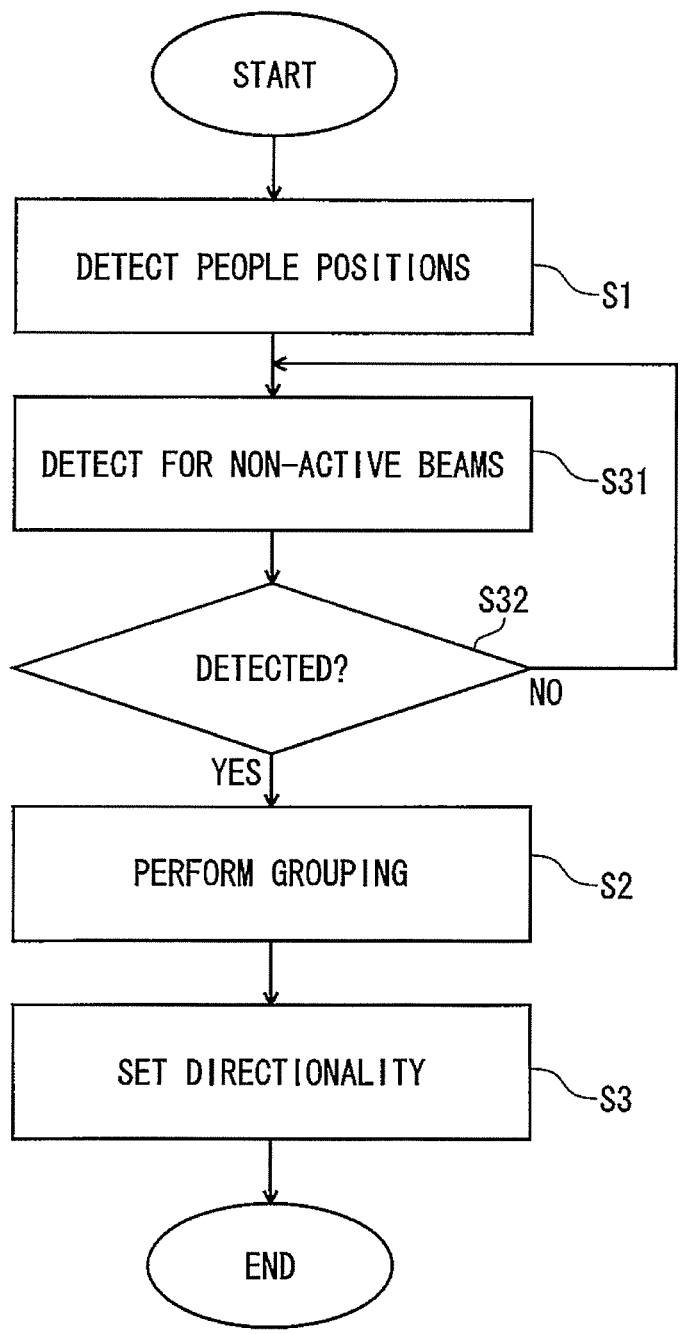
FIG. 15 is flow chart showing an example of directionality setting processing flow in the unit 4 according to the fourth exemplary embodiment.

FIG. 15 is a flow chart showing an example of directionality setting processing flow in a unit 4 according to the fourth exemplary embodiment. In the processing shown in FIG. 15, subsequently to detecting the positions of people, non-active beam detection processing is performed by the non-active beam detector 43 (or detection processing for a person who has ceased speaking is performed by the non-active beam detector 43a shown in FIG. 14) (S31), determination is made as to whether or not a non-active beam (or person who has ceased speaking) has been detected (S32), and re-grouping is performed when there is a non-active beam (or person who has ceased speaking) (S32: YES).

Accordingly, the grouping module 32 performs re-grouping when by the speech state monitoring modules of the non-active beam detector 43 or 43a have no longer observed output of a directionality controller 34 of set directionality, or speech of a detected person, for a specific duration or greater. This re-grouping is performed excluding the directionality controller, or the person, no longer observed for the specific duration or longer.

Note that a person who has been excluded from grouping, such as by the non-active beam detection described above, can be re-included as a person subject to grouping by utilizing processing of the second exemplary embodiment.

Moreover, when detecting a group or person who has ceased speaking solely based on image data, input from the directionality controller 34 and the microphone array 12 to the non-active beam detector 43 or 43a, as shown in FIG. 13 and FIG. 14, is not then required.

According to the present exemplary embodiment, the beam or person who has stopped speaking is detected, and beams no longer required can be excluded. Since grouping is re-performed by detecting the presence or absence of speech, the videoconferencing system can always be operated in an optimally grouped state.

Fifth Exemplary Embodiment

A unit 4 according to the fifth exemplary embodiment has an integrated detector 44 including the speaker detector 41, 41a explained in the second to the fourth exemplary embodiments, the people number increase-decrease detector 42 and the non-active beam detector 43.

Figure 16:
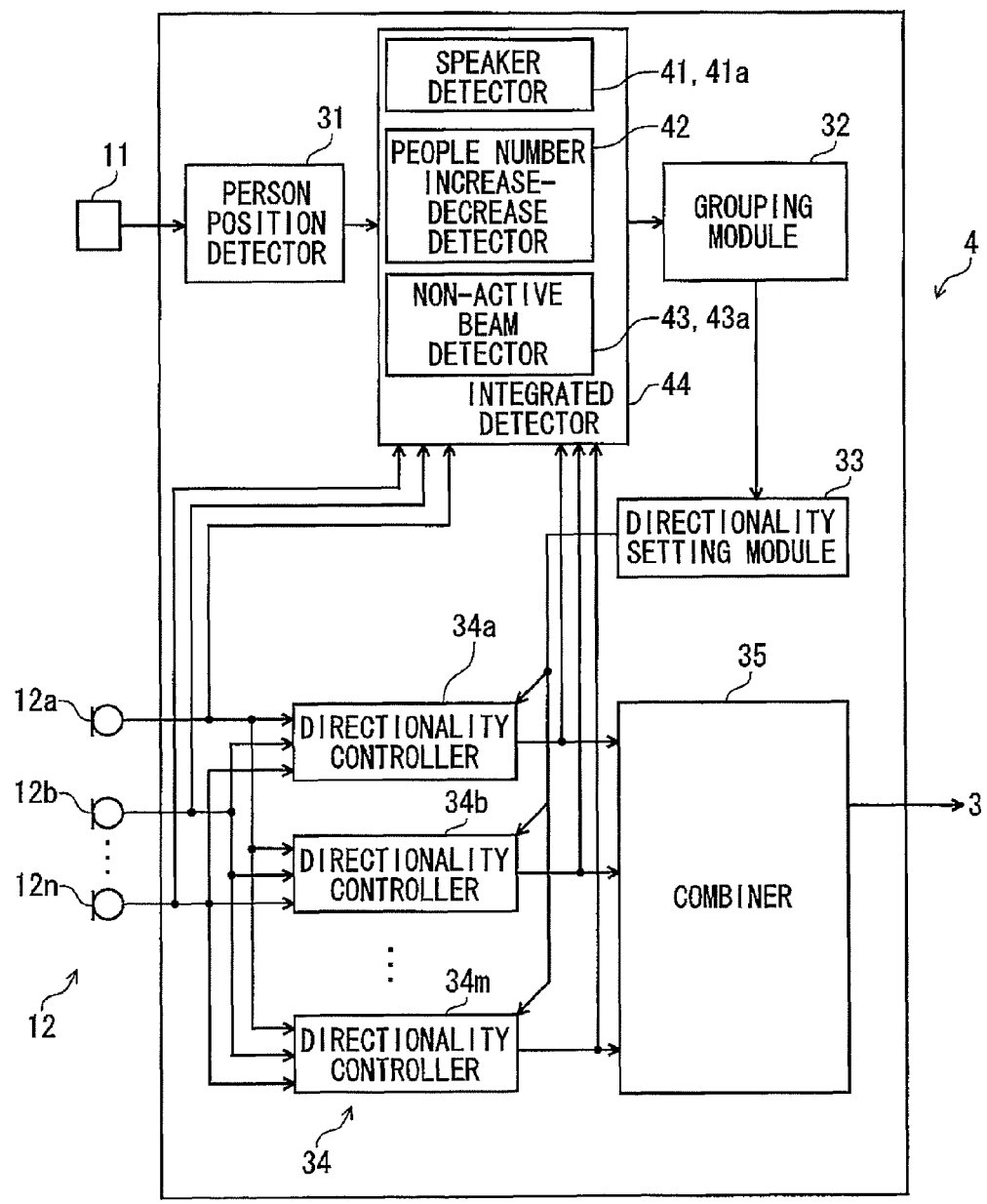
FIG. 16 is a block diagram showing a software configuration of an unit 4 according to a fifth exemplary embodiment.

FIG. 16 is a block diagram showing a software configuration of a unit 4 according to the fifth exemplary embodiment. As shown in FIG. 16, the unit 4 has the integrated detector 44 including the speaker detector 41, 41a, the people number increase-decrease detector 42 and the non-active beam detector 43. Configuration does not necessarily include all three of these detectors 41, 42, and 43. FIG. 16 shows a case in which there are m-individual directionality controllers 34.

As a result, the videoconferencing system 1 is even more user friendly due to the unit 4 being a unit including the benefits explained for the second to the fourth exemplary embodiment. Furthermore, since re-grouping is performed when a speaker is detected, when an increase or decrease in the number of people is detected, or when presence or absence of speech is detected, the videoconferencing system can always be operated in an optimally grouped state.

According to the first to the fifth exemplary embodiments, an audio signal processor, a television set, and a videoconferencing system can be provided capable of securing audio signal processing in real time. In particular, since directionality is configured on a group by group basis, even when there are a significant number of people participating and only limited computing resource is available, an audio signal processor and corresponding set can be achieved that both covers all of the participants and gives high noise suppression performance, and does so with only a small computational load.

While the camera 11 is employed to detect the position of people in each of the above exemplary embodiments, configuration may be made to detect people without using a camera.

Figure 17:
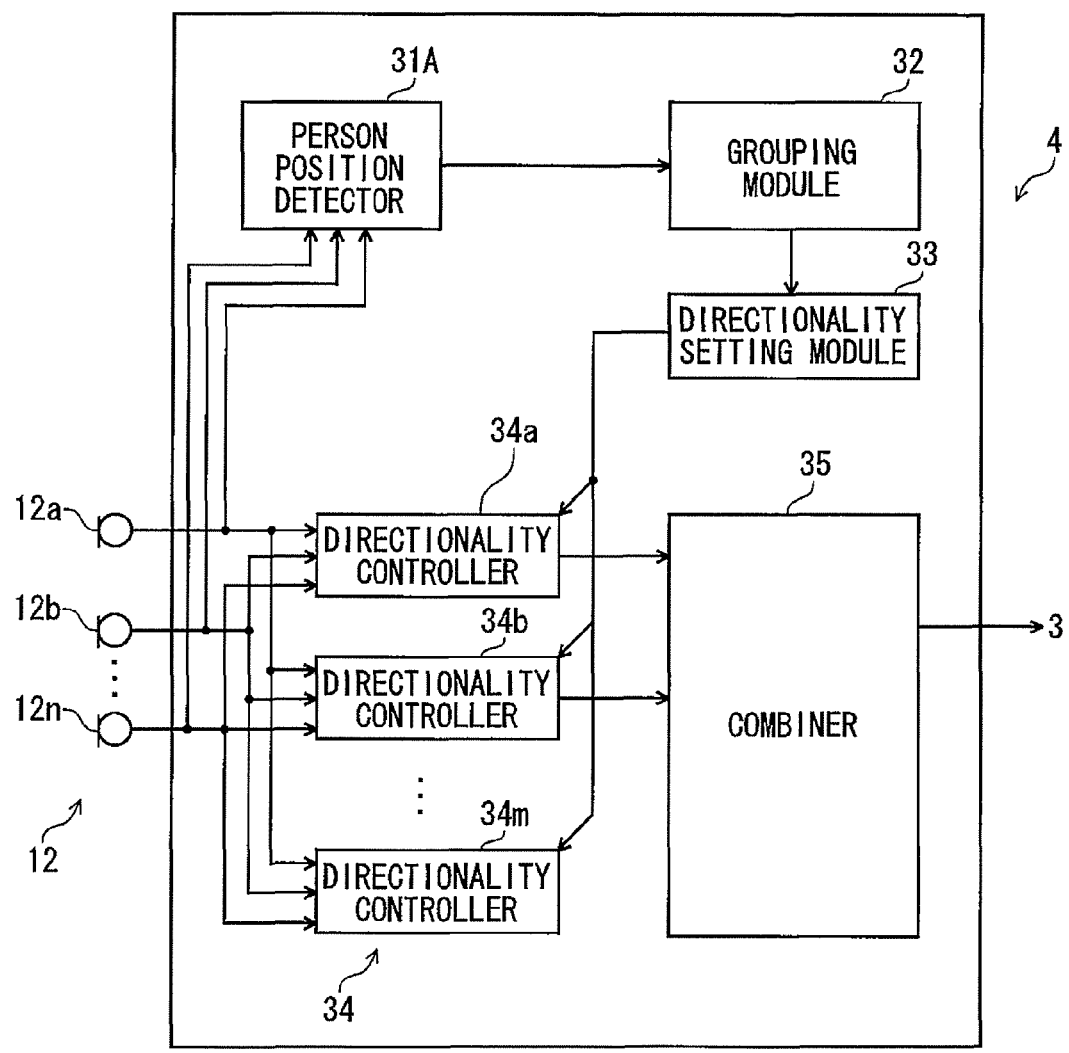
FIG. 17 is a block diagram showing a software configuration of a unit for detecting positions of people solely from the audio signals from each microphone of a microphone array 12.

FIG. 17 is a block diagram showing a software configuration of a unit for detecting the positions of people just from the audio signals emanating from each of the microphones of the microphone array 12.

The person position detector 31A is a processing section for estimating the direction from which sound arrives from the audio signals of plural microphones. It is possible to employ Direction Of Arrival (DOA) estimation as the estimation method, such as a MUSIC method, ESPRIT method.

With respect to DOA estimation, see, for example, Chapter 10 of "Adaptive Signal Processing with Array Antenna" (Science and Technology Publishing Company, Inc., 2004) by Nobuyoshi Kikuma.

According to the configuration shown in FIG. 17, a reduction in cost can be achieved since provision of a camera is not required. Furthermore, in an environment in which there is little sound other than that emanating from people, malfunction does not readily occur due to incorrectly detecting a direction of a noise as a person.

Program(s) for executing the operations described above may be configured by wholly or partly recording or storing, such as a computer program product by recording on a portable medium like a floppy disk, CD-ROM or the like, or on a storage medium, such as a hard disk, storing. Such a program is read by a computer and wholly or partly executed. Alternatively, the program can be wholly or partly distributed or provided via a communication network. The audio signal processor, television set and videoconferencing system described in the above exemplary embodiments can be readily implemented by a user downloading the program via the communication network and installing it on a computer, or by installing on a computer from a storage medium.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. An audio signal processor comprising:
a person position detector configured to detect a position of each of a plurality of persons present in a specific space;
a grouping module configured to allocate the detected persons to a plurality of groups, wherein the number of the groups is less than a given number of two or more and less than or equal to the number of the detected persons;
a plurality of directionality controllers configured to control directionality of a microphone array; and
a directionality setting module configured to set directionality for each of the groups in a corresponding one of the directionality controllers.

2. The processor of claim 1, wherein the grouping module is configured to allocate the detected persons to the groups so as to maximize a noise suppression performance of the microphone array.

3. The processor of claim 1, wherein the grouping module is configured to allocate the detected persons to the groups such that the number of persons allocated to each of the groups is evened out.

4. The processor of claim 1 further comprising:
a group number changing module configured to change the number of the groups or the given number.

5. The processor of claim 1, further comprising:
a speaker detector configured to detect one or more speakers among the detected persons,
wherein the grouping module is configured to allocate the detected persons to the groups based on only the detected speakers.

6. The processor of claim 1,
wherein the person position detector comprises:
a number detector configured to detect the increase or decrease in the number of the detected persons, and
wherein the grouping module is configured to allocate the detected persons to the groups based on the increase or decrease in the number of the detected persons.

7. The processor of claim 1, further comprising:
a speech state monitoring module configured to monitor an output of each of the directionality controllers or a speech of the detected persons, and
wherein the grouping module is configured to allocate the detected persons to the groups, excluding the directionality controller or excluding the person not observed for a specific duration or greater, when the output of each of the directionality controllers or the speech of the detected persons has not been observed for the specific duration of time or greater.

8. The processor of claim 1, wherein
the person position detector is configured to detect each position of the persons based on: an image of the specific space captured by a camera; or audio signals from the specific space.

9. A television set comprising:
a display configured to display television broadcast contents;
a communication interface configured to communicate with another television set via a communication line; and
an audio signal processor comprising:
a person position detector configured to detect a position of each of a plurality of persons present in a specific space;
a grouping module configured to allocate the detected persons to a plurality of groups, wherein the number of the groups is less than a given number of two or more and less than or equal to the number of the detected persons;
a plurality of directionality controllers configured to control directionality of a microphone array; and
a directionality setting module configured to set directionality for each of the groups in a corresponding one of the directionality controllers.

10. A non-transitory computer-readable medium storing a program for causing the computer to perform operations comprising:
(a) detecting a position of each of a plurality of persons present in a specific space;
(b) allocating the detected persons to a plurality of groups, wherein the number of the groups is less than a given number of two or more and less than or equal to the number of the detected persons;
(c) controlling directionality of a microphone array by the plurality of the directionality controllers; and
(d) setting directionality for each of the groups in a corresponding one of the directionality controllers.

* * * * *